Patented Aug. 4, 1942

2,291,840

UNITED STATES PATENT OFFICE 2,291,840

AUTOMATIC CONTROL FOR STOKERS

Charles B. Spangenberg, Minneapolis, Minn., assignor to Minneapolis-Honeywell Regulator Company, Minneapolis, Minn., a corporation of Delaware Application January 8, 1938, Serial No. 183,928

8 Claims. (Cl. 236—46)

This invention relates to automatic control mechanism for heat generating apparatus or the like and is more particularly concerned with fully automatic control mechanism for stokers.

The invention is intended principally for regulating a stoker of the type which feeds or delivers a solid fuel such as coal to a furnace or boiler. Such stokers are generally operated intermittently, the duration or frequency of operating intervals being governed so as to provide a rate of combustion sufficient to meet the heating demands being made on the system.

In utilizing heating systems of various types for heating buildings it has been found advantageous to control the heat source, for example the stoker, solely in response to outdoor temperatures. However, this method of control is imperfect particularly in larger buildings inasmuch as the indoor temperatures are not always held at the proper value throughout the usual ranges of outdoor temperatures. This is caused by the variations in rate of heat losses at different outdoor temperatures.

The present invention avoids undesirable variations in indoor temperature by employing an additional control device responsive to boiler water temperature for cooperating with the outdoor control device. By thus influencing the control system in accordance with boiler water temperature, variations in indoor temperatures from desired values can be avoided because a correction made in boiler water temperature will be general, and will tend to maintain a correct inside temperature in all rooms. Indoor thermostats must necessarily be located in one fixed place and will operate to govern the temperature of an entire building in accordance with the needs of that one particular location. A correction applied to the control system in response to boiler water temperature will operate to maintain the indoor temperature of the entire building more uniformly accurate. For every outdoor temperature there is a corresponding value of boiler water temperature which will be proper to meet the heating load demands and maintain all parts of the building being heated at proper temperatures. The outdoor thermostat of the present invention operates to bring the boiler water to the proper temperature corresponding to the heating load at the particular outdoor temperature and the boiler thermostat operates to maintain the boiler water at that temperature. When outdoor thermostats alone are used the boiler water temperature and/or indoor temperature may fluctuate considerably when outdoor temperature is not changing and there is nothing to dampen out such fluctuations.

While the invention is herein disclosed as applied to one particular heating system, it is to be understood that it is equally adaptable for use with other types of heating systems and combustion devices.

The objects of the invention are:

To provide automatic control means for stoker operating in response to both outdoor and boiler water temperatures.

To provide novel structural means for automatically regulating the operating of stokers in response to both outdoor and indoor temperature.

To provide means for operating a heating system to produce a substantially lower rate of heating at night than in the daytime or to produce no heating at night.

To provide means for operating a heating system having an outdoor thermostat for determining the heating load and consequently the temperature of circulating fluid to be maintained, and a boiler thermostat for maintaining the said temperature of circulating fluid.

To provide in combination with an automatic temperature controlled stoker, a device commonly known as a "morning pick-up" to supply additional heat in the morning or early part of the day to bring the temperature of the building up to the desired daytime temperature after the building temperature has been at a relatively low value during the night.

To provide a device in an electric control system for eliminating inaccuracies in the control caused by voltage variations in the current supply.

Figure 1:
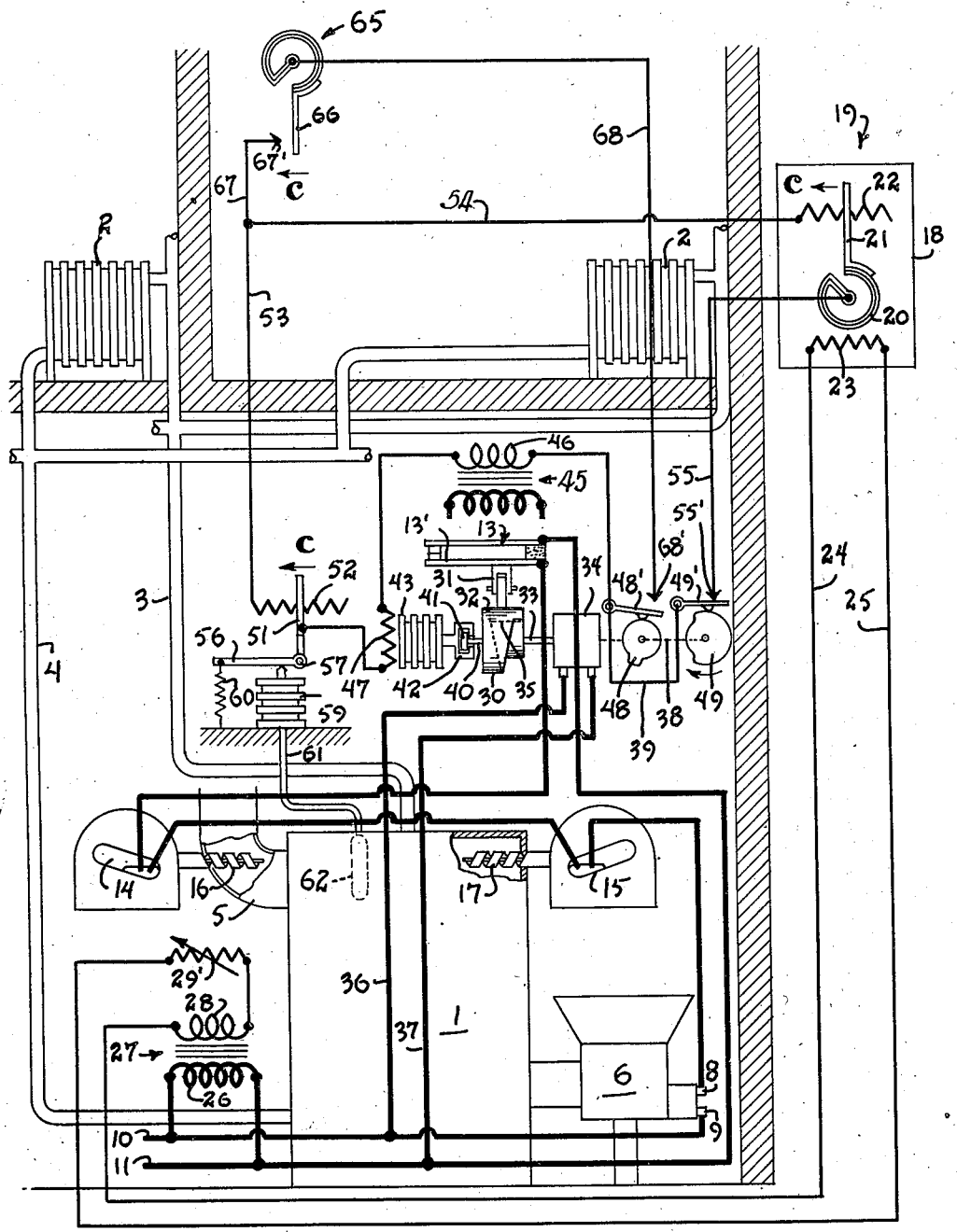
Figure 1 represents in more or less diagrammatic form a heating system having my control system applied thereto for regulating an automatic stoker forming part of the heating system.

Referring to the drawings and more particularly to Figure 1, a portion of a building having a heating system of conventional type therein is shown. The heating system has a furnace 1 including a boiler and radiators 2 in different rooms of the building connected to the boiler by means of risers 3 and a return pipe 4 for conveying the cooler fluid back to the lower part of the boiler. The furnace has a flue or pipe 5 for purposes of draft and for conveying away the burnt gases of combustion. Numeral 6 indicates an automatic stoker for feeding a solid fuel such as coal into the combustion chamber of the furnace. The automatic stoker includes a hopper for feeding in the fuel and an automatic conveyor or other device operated by an electric motor for delivering the fuel into the furnace. The electric motor has terminals 8 and 9 for connection to a source of power. Terminal 9 is directly connected to a line conductor 10 which with the line conductor 11 leads to an external source of electrical power not shown. The line conductor 11 passes in series through three different switches indicated by the numerals 13, 14 and 15, and thereafter connects to the terminal 8 of the stoker motor. Obviously, electrical energy is supplied to the stoker motor from the line wires 10 and 11 and the circuit may be broken by any of the three switches 13, 14 and 15.

The switches 14 and 15 are automatic mercury type switches which are well-known and need not be described in detail. These switches are operated by thermostatic devices 16 and 17 respectively. Thermostatic device 16 is located in the flue or pipe of the furnace and is arranged to open the contacts of switch 14 at an unusually low flue temperature such as would occur at a time when the fire in the furnace has been extinguished. Thus the switch 14 serves to cut off the supply of energy to the stoker motor when the fire is out, to prevent the feeding of raw fuel into the combustion chamber at such times. The switch 15 is operated by the thermostatic element or device 17 which is arranged to be responsive to the temperature of the boiler water and which operates to open the contacts of the switch 15 at times when the temperature of the boiler water is unduly high. Thus at these times the supply of energy to the stoker is cut off and the danger of explosions of rupture of the boiler or circulating system due to excessively high pressures is avoided.

The switch 13 is automatically operated and the rate of heat generation in the heating system is governed by automatically regulating the duration of closed periods of this switch and consequently the duration of the on or operating periods of the stoker.

The mechanism for operating the switch 13 includes the cam represented by the numeral 30 splined on a shaft 33, which shaft is driven by a motor 34. Integrally connected to a movable arm 13' of the switch 13 is a supporting means for roller member 31 which forms a cam follower for the cam 30. The cam 30 is of generally cylindrical conformation but has one portion of relatively larger diameter and another portion of relatively smaller diameter, the boundary between the two portions being helix-like, as shown. It will be seen that at the upper part of the cam at 32 as seen on Figure 1 there is a portion of the cam of relatively larger diameter which extends the entire longitudinal dimension of the cam. The broken line indicated by the character 35 indicates the rise from the portion of the cam of shorter diameter to the portion of relatively greater diameter. It will be seen that at the left-hand end of the cam as seen on Figure 1, there is a portion of the cam having an unbroken surface all the way around the circumference of relatively larger diameter. Also at the right-hand end of the cam as seen on Figure 1, it will be seen that the portion of the cam of relatively larger diameter is of relatively short angular extent. The cam being splined onto the shaft 33 and movable longitudinally thereon the cam follower 31 can be made to follow along any portion of the cam surface. Obviously, when the cam follower 31 is following the portion of the cam surface of greater diameter the switch 13 is held in closed position, and when the cam follower 31 is following the cam surface of relatively shorter diameter the switch 13 is in the open position. The point at which the cam follower 31 drops from the portion of greater diameter to the portion of shorter diameter is determined by the longitudinal position of the cam on shaft 33. When the cam 30 is in its extreme position after being moved to the right, the cam follower follows the unbroken surface of the left-hand end of the cam and holds the switch 13 continuously closed. When the cam is in its extreme left position the cam follower 31 holds the switch 13 closed for periods of minimum duration.

The cam 30 has an integral arbor or spindle 40 at the end of which is a rotary or circular member 41. The rotary member 41 is enclosed within casing 42, the spindle 40 extending through an opening in the casing as shown. The casing 42 is integrally connected to a bellows 43 as shown, which bellows is of the expansible type containing a volatile fluid. Expansion and contraction of the bellows 43 operates through the members 42 and 41 to move the cam 30 longitudinally back and forth on the shaft 33.

The motor 34 may be an electric motor connected by conductors 36 and 37 to the line wires 10 and 11 respectively or it may be a mechanical or clock-driven motor. The motor 34 also drives a shaft indicated by the broken line 38 and is arranged to cause the shaft 38 to make one revolution during a period of twenty-four hours. The shaft 33 is driven at a higher rate, making one revolution in a relatively shorter period of time for example one hour. Mounted on the shaft 38 and driven thereby are two cams 48 and 49. The greater part of the contour of the cam 48 is of uniform circular formation as shown, and the cam has a raised portion or dwell of relatively short angular extent as shown. The cam 49 has a contour, the major portion of which is of uniform circular conformation having a radius of relatively greater extent than the other portion of the cam contour which is also of uniform circular conformation but of relatively shorter radius. Associated with the cam 48 and operated thereby is a switch 48' and associated with the cam 49 and operated thereby is a switch 49'. It will be seen that the dwell or raised portion of cam 48 closes the switch 48' and the portion of cam 49 of relatively greater radius retains the switch 49' in closed position. The portions of cam 49 of relatively greater and less radius represent day and night respectively and the operation of the motor 34 is so timed that the cam 49 will close the switch 49' at a predetermined time in the morning and open it at a predetermined time in the evening. The cam 48 closes the switch 48' at a predetermined time in the morning which is preferably the same time that the cam 49 closes the switch 49'. The switch 48' has a fixed contact 68' which connects to an indoor thermostat generally indicated at 65 by a conductor 68. The switch 49' has a fixed contact 55' which connects to an outdoor thermostat generally indicated at 19 by conductor 55. The indoor thermostat generally indicated at 65 is of the conventional bimetallic type having a movable arm 66 as shown. Associated with the movable arm 66 is a fixed contact 67' which connects through conductors 67 and 53, a resistance 52, a movable arm 51 and a resistance 47 to one terminal of the secondary winding 46 of a transformer generally indicated at 54. The other terminal of the secondary winding 46 is connected as shown to the pivoted end of the switch arm 48' which is connected in turn by conductor 39 to the pivoted end of the switch arm 49'. Associated with the outdoor thermostat generally indicated at 19 is a slide wire resistance 22, one end of which is connected by a conductor 54 to the juncture of conductors 67 and 53 as shown. The structure so far described obviously provides for an electrical circuit through the secondary winding 46 of the transformer 45, switch 49' which is shown in closed position, through conductor 55, the outdoor thermostat, conductors 54 and 53, a portion of the resistance 52, the arm 51 and resistance 47 back to the secondary winding 46. When the switch 48' is closed a parallel branch circuit is formed through the conductor 68 and the indoor thermostat and conductor 67 to the conductor 53. This parallel branch circuit operates as a shunt to the outdoor thermostat. The transformer 45 which serves to energize the above described circuit or circuits is of the voltage step-down type having a greater number of turns in the primary than in the secondary and is of conventional type.

The resistance 47 in the circuit above described is a heating resistance and is located adjacent to the bellows 43 so as to heat the volatile fluid therein to a greater or less extent and thereby cause expansion or contraction of the bellows 43. The degree of heating of resistance 47 therefore governs the longitudinal position of cam 30 splined on the shaft 33. The amount of heating the resistance 47 is of course governed by the amount of resistance which is in circuit with this resistance. The amount of resistance in circuit with the resistance 47 is determined by the outdoor thermostat and also by the position of the arm 51 along the slide wire resistance 52. It will be seen from the circuits above described that switch 49' being closed during the daytime the resistance of the outdoor thermostat is in circuit with heating resistance 47 during that time, except for a relatively short period of time in the morning when switch 48' is closed. The resistance of the outdoor thermostat is then shunted out of the circuit through heating resistance 47 provided the indoor thermostat 65 is closed at that time.

The movable arm 51 associated with slide wire resistance 52 is operated by a thermostatic device responsive to boiler water temperatures. The arm 51 is formed integrally with an arm 56 extending at right angles, the two arms being pivoted at point 57 as shown. Associated with the arm 56 in position to move that arm is an expansible bellows 59. The outer end of the arm 56 is biased against the operating end of the bellows by a tension spring 60 which is attached to the base or mounting means of the bellows as shown. The bellows 59 is filled with an expansible fluid and the interior of it communicates by a pipe 61 with a bulb 62 located in or adjacent to the boiler water. This boiler water responsive thermostatic device operates in a conventional manner and need not be described in great detail. Variations in temperature of the boiler water cause expansion or contraction of the volatile fluid within the bulb 62, pipe 61 and the bellows, causing the bellows to expand or contract thereby moving the arms 56 and 51 angularly and causing arm 51 to slide in one direction or the other along slide wire resistance 52.

A lowering in temperature of the boiler water will cause contraction of the bellows 59 and consequent movement of the arm 51 to the left as indicated, thus cutting out some resistance from the circuit to heating resistance 47. The reduced resistance in circuit with resistance 47 will cause increased heating at that resistance and consequently increased expansion of the bellows 43. Expansion of the bellows 43 causes the cam 30 to be moved to the right thereby causing the cam follower 31 to follow the portion of the cam having greater diameter during a greater proportion of each revolution of the cam. This causes the switch 13 to be held closed during a greater portion of each revolution of the cam 30 and consequent longer periods of energization or operation of the stoker 6. The effect of the boiler responsive thermostatic device is to hold the boiler water temperature constant at a predetermined value by varying the duration of firing periods of the stoker and consequently the rate of heat generation in the furnace.

The outdoor thermostatic device generally indicated at 19 comprises a bimetallic thermostatic element 20 of conventional type similar to that of the indoor thermostat and a movable arm 21. Movable arm 21 is associated with the slide wire resistance 22 and operates in response to outdoor temperatures to regulate the amount of resistance in circuit with the heating resistance 47. A drop in outdoor temperature influences the thermostatic element to move arm 21 to the left as indicated on the diagram, thereby cutting out some resistance from the circuit of heating resistance 47 and causing increased heating at that resistance. The increased heating operates as above described in connection with the boiler thermostat to increase the duration of firing periods and consequent rate of heat generation of the furnace. The outdoor thermostatic device is operative when the switch 49' is closed, that is, during the day, to regulate the duration of firing periods in accordance with outdoor temperatures. In other words, the outdoor thermostat regulates the position of cam 30 for any particular outdoor temperature to provide for a rate of heating corresponding with that outdoor temperature. The boiler thermostat operates to maintain the boiler water temperature constant at a value corresponding to that rate of heat generation necessary to meet the load demands as measured by the outdoor thermostat. The purpose of the boiler water thermostat is to compensate for any changes in boiler water temperature at times when the outdoor thermostat is not operating to change it. The resistances 22 and 52 are designed to bear the proper relationship to each other so that the boiler thermostat can operate to maintain substantially constant predetermined boiler water temperatures as determined by heat loads measured by the outdoor thermostat. As above described, the switch 49' is open at night and breaks the circuit through the heating resistance 47. This causes the bellows 43 to contract, moving the cam 30 to its extreme leftward position so that the cam follower follows that portion of the cam having a relatively greater radius but of minimum angular extent. Thus at night switch 13 is held closed for periods of minimum duration during the rotation of cam 30 and the rate of firing will be just enough to maintain the fire so that the temperature in the building will be at a relatively low value. The indoor thermostat 65 is closed at temperatures below a predetermined desired value and normally this thermostatic switch will be closed at that time in the morning when the switch 48' is closed by cam 48. While switch 49' is closed at this time the outdoor thermostat is shunted out of the circuit through the heating resistance 47 by the parallel branch circuit through switch 48', conductor 68 and the indoor thermostat. The entire resistance of the outdoor thermostat being shunted out of the circuit through the heating resistance 47 at this time, there is a relatively high rate of heating at 47 and consequent greater expansion of the bellows 43. Obviously this provides for a relatively high rate of heat generation in order to bring the temperature of the building up to the desired predetermined value as quickly as possible in the morning. When the desired predetermined temperature is reached, the indoor thermostatic switch device will open, breaking the parallel branch circuit and again putting the outdoor thermostat in control of the position of cam 30. When outdoor temperatures are high enough so that it is unnecessary to supply heat to the building the outdoor thermostat will position cam 30 so that only enough fuel will be fed into the furnace to maintain a fire without heating the building.

Referring to the outdoor thermostatic device generally indicated at 19, this device is located within an enclosure 18 exterior of the building. Within the enclosure and located at a point which may or may not be adjacent to the thermostatic element 20 is heating resistance 23. This resistance is connected by a conductor 24 to one terminal of a secondary winding 28 of a transformer 27 and is connected by conductor 25 through a variable resistance 29 to the other terminal of the secondary winding 28. The transformer 27 has a primary winding 26 which is connected to the line wires 10 and 11 as shown, and is similar to the transformer 45 previously described. The function of the heating resistance 23 is to maintain the interior of the enclosure 18 at a substantially constant number of degrees above that of the outside atmosphere. It is well-known to heating engineers that compensation must be made in the control system for the effect of variations in wind velocity, direction, solar radiation and the like. Heat losses in the building will vary with wind conditions and the like even though outdoor temperatures may not vary. The temperature within the enclosure 18 is dependent upon the rate of heat dissipation from the element 23 to the outside atmosphere. As the temperature within the enclosure 19 is always maintained above that of the outside atmosphere there will always be a path of heat flow from the interior to the exterior of the enclosure 19. Variations in wind conditions, solar radiation and the like, for example a high wind velocity, will cause more heat to flow from the interior of enclosure 18 to the outside and a consequent greater rate of heat dissipation from resistance 23. Thus the temperature within enclosure 18 will vary accordingly and the thermostatic device will respond to compensate for the above described conditions. The temperature differential between the interior and exterior of enclosure 18 may be conveniently varied by adjusting the variable resistance 29. Thus the variable resistance 29 provides also for calibrating the outdoor temperature responsive device. By adjusting resistance 29 the thermostatic element 20 can be made to respond as desired without change in outdoor temperature. In practice this adjustment is made at time of installation so as to make the rate of heat dissipation from enclosure 18 correspond to the rate of heat loss from the particular building being heated. Thus the thermostatic element 20 can be calibrated so as to give the necessary response for a particular outdoor temperature in any building regardless of its heat loss or leakage characteristics.

From the above description it is though that the operation of my invention will be clearly apparent to those skilled in the art. The device operates fully automatically to regulate the rate of heat generation at the furnace in accordance wih outdoor conditions and to reduce the rate of heating at night. For example, during the day the switches being in the position shown in Figure 1, the outdoor thermostat is operating to control the position of cam 30 and consequently the rate of heat generation in the furnace. For example, a fall in temperature causes arm 21 of the outdoor thermostat device to move to the left as indicated, which in turn causes cam 30 to be moved to the right as above described thereby providing for longer operating periods of the stoker. The cam 30 makes one revolution per hour or other similar period of time and the duration of the closed period of switch 31 may be for a number of minutes during each hour as determined by the outdoor temperature conditions. Whenever the outdoor thermostatic device has set cam 34 for a certain rate of heat generation and consequently a certain boiler water temperature to meet the load conditions, the boiler water thermostatic device will operate to maintain this temperature constant in the manner above described. At a predetermined time in the evening, as determined by cam 49, the switch 49' will open, this breaking the circuit to the heating resistance 47. During the night the stoker will then be operated at a minimum capacity as above described. At a predetermined time in the morning, which may be chosen as desired by adjusting the positions of cams 48 and 49 with respect to the shaft 38 or by adjusting the timing of the motor 34, switches 48' and 49' will close. These two switches complete circuits through both the indoor and outdoor thermostats to the heating resisance 47 as has been pointed out. During the time that switch 48' is closed a portion of the resistance 52 will be in circuit with the heating resistance 47 but resistance 22 will be shunted out providing the indoor thermostatic switching device is closed. At the time switch 48' closes in the morning the indoor thermostatic switch will ordinarily be closed because of the low temperatures which have been maintained during the night. As soon as the dwell of cam 48 permits switch 48' to open, the outdoor thermostat will again be included in the circuit of heating resistance 47 and the outdoor thermostat will control the rate of heating, or as soon as the indoor temperature reaches the predetermined desired value, the arm 66 of the indoor thermostat will move away from its associated contact 67' and the outdoor thermostat will then be in circuit with the heating resistance 47. The arrangement is preferably designed so that the indoor thermostatic switch opens at approximately the same time that the cam operated switch 48' opens.

Figure 2:
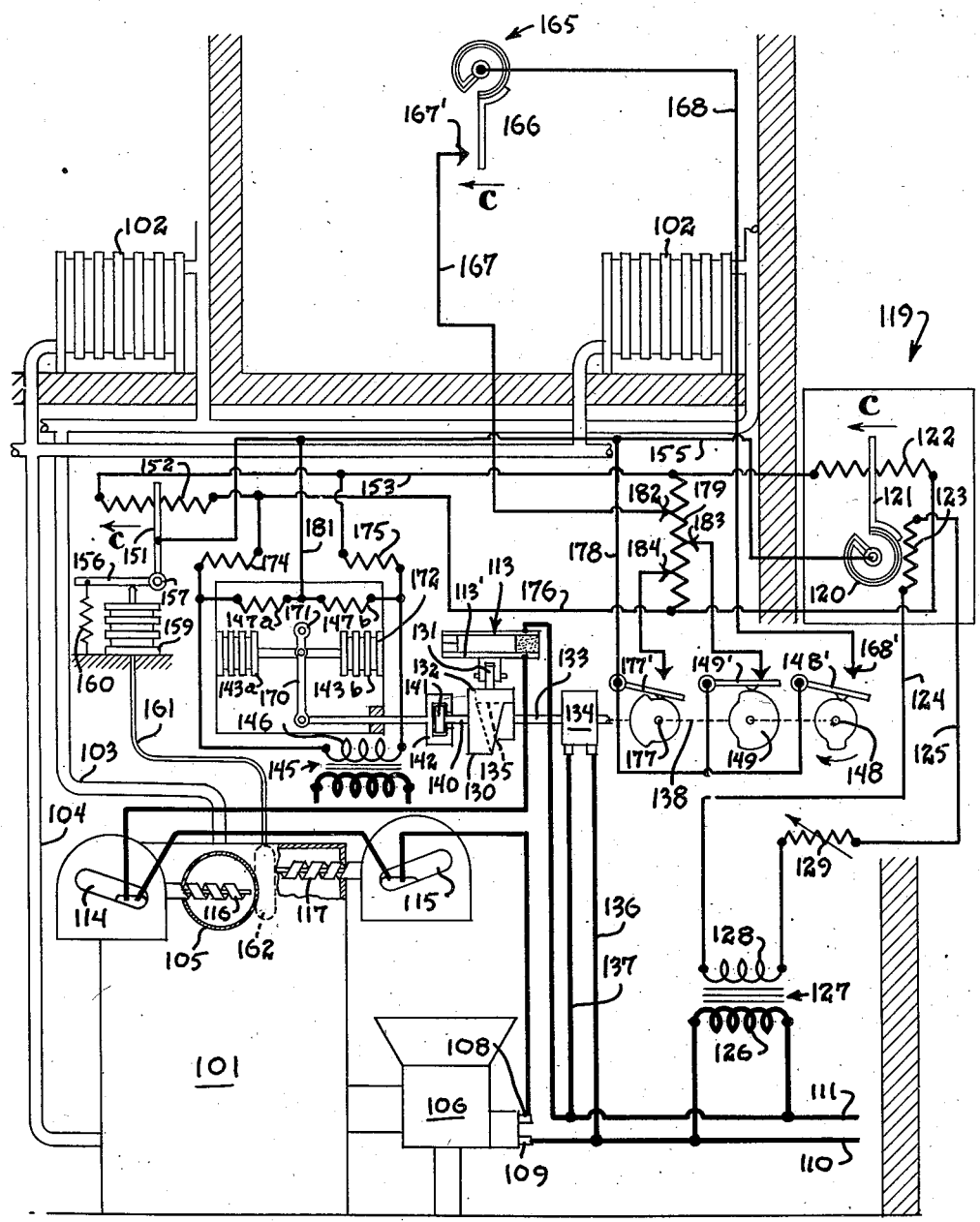
Figure 2 represents diagrammatically the heating system of Figure 1 having another form of my control system applied thereto.

The modification illustrated in Figure 2 is similar to that of Figure 1 in many respects and corresponding elements and features are correspondingly numbered. Corresponding parts of the embodiment of Figure 2 need not again be described but the manner in which it differs structurally and in operation from Figure 1 will be pointed out.

In Figure 2 the cam 130 is moved longitudinally on the shaft 133 in a manner similar to that in Figure 1 but by means of a bellows 143a and a bellows 143b working in opposition. Each bellows is connected as shown to a lever 170 which is pivoted at 171, and angular movement of which operates to slide the cam 130 on shaft 133. The bellows are located within a suitable chamber 172 and the connection between the lever 170 and the cam 130 extends through a side wall of the chamber. Within the chamber 172 and associated with each bellows is a heating resistance numbered 147a and 147b. These two resistances are connected in series, and in series also with protective resistances 174 and 175 which are in turn connected across the terminals of the slide wire resistance 152. The control circuit in the embodiment of Figure 2 is energized by transformer 145 as shown, which corresponds to the transformer 45 of Figure 1. The terminals of the slide wire resistance 152 are connected to terminals of the slide wire resistance 122 by conductors 153 and 176 respectively as shown. The arm 151 of the boiler thermostatic device is connected by conductor 155 to the outdoor thermostat as shown, and conductor 155 is connected by conductor 181 to the junction of resistances 147a and 147b.

In addition to the cams 148 and 149 in Figure 2, corresponding to the similar cams in Figure 1, an additional cam 177 is provided in this embodiment. It will be seen that cam 177 is associated with and operates to close the switch 177' during the night and to maintain this switch closed at all times when switch 149' is open. The pivoted ends of the switch arms 177', 149' and 148' are connected to a common conductor as shown, which in turn connects by a conductor 178 to the conductor 155. Connected across the conductors 153 and 176 is a resistance 179. This resistance has three connections as shown, one to the fixed contact of switch 177', one to the fixed contact of switch 149' and one to the fixed contact of the indoor thermostatic device. The indoor thermostatic element is in turn connected by conductor 168 to the fixed contact of switch 148'. Thus it is seen that by operation of the cam operated switches different portions of the resistance 179 may be put in circuit with one side or the other of the circuit through resistances 152 and 122. During the day the mid point of the resistance 179 is connected through switch 149' to the conductor 155 which as above described connects through conductor 181 to the juncture of resistances 147a and 147b. Thus during the day the resistance 179 has no effect to vary the values of current flow in resistances 147a and 147b. During the night the switch 177' is closed and it is seen that the contact 184 causes a smaller portion of the resistance 179 to be in the circuit having resistance 147b. Thus there is a greater current flow in that resistance and the increased expansion of bellows 143b causes the cam 130 to be moved to the left providing for relatively short duration of operating periods of the stoker at night. During the period in the morning when switch 148' is closed and the indoor thermostatic switch is closed, it is seen that contact 182 of resistance 179 is connected through the indoor thermostatic switch and switch 148' and conductor 178 to conductor 155. Thus the minor portion of the resistance 179 is now in circuit with resistance 147a and the increased heating at that resistance causes expansion of bellows 143a to move cam 130 to the right and produces an increased duration of firing periods. Whenever the outdoor thermostat indicates that no heating is necessary the cam will be in its extreme left position providing for firing intervals just long enough to maintain a fire in the furnace.

From the above it should be apparent that the operation of the embodiment of Figure 2 is similar to that of Figure 1. In Figure 2 as in Figure 1 the outdoor thermostat measures the load and determines a rate of heat generation and boiler temperature which is maintained constant at any particular outdoor temperature by means of the boiler thermostat. The two bellows used in Figure 2 acting oppositely to each other necessitate the use of the two heating resistances 147a and 147b which are alike. The advantage of the use of two similar resistances and associated bellows arrangement lies in that voltage variations in the electrical control system will be balanced by reason of the variations neutralizing each other through the effect of one bellows acting oppositely to the other. It is well-known that in most electrical circuits there will be undesirable variations in voltage in the external source of supply which will cause undesirable results in the control system. The arrangement entirely eliminates the effect of such undesirable voltage variations. As is apparent from the structural description, the night switch 177' operates to place an additional resistance of fixed amount in circuit with resistance 147b to provide for reduced heating at night as described, or if desired, minimum operation of the stoker. The switch 148' places an additional resistance of fixed amount in circuit with the resistance 147b for a period in the morning to provide the rate of heating during that time which is above that ordinarily necessary to maintain the desired indoor temperature and which compensates or supplies additional heat to make up for the relatively low temperatures maintained during the night.

In both modifications of the invention, the boiler thermostatic device, as pointed out, maintains the boiler water temperature at predetermined values corresponding to the load as measured by the outdoor thermostat. Thus whenever the indoor temperature or boiler water temperature tends to vary or depart from the said predetermined value, and which variation of course cannot be compensated for by the outdoor thermostat, the boiler thermostat applies the correct amount. By maintaining the boiler water temperature at all times at the proper value, all the rooms in the house are maintained at the desired predetermined indoor temperature. The use of indoor thermostats for regulating the heating is made unnecessary and the difficulties inherent in systems for regulating heating according to a single point being heated, are avoided. My automatic arrangement provides for reducing the rate of heating and maintaining a lower temperature at night, and eliminates the necessity of attention from occupants of the building by manual operation of switches or the like. It is usually desired to maintain buildings at a lower temperature at night when occupants are asleep for purposes of health and saving of fuel at the same time. Necessarily in the morning additional heat must be supplied beyond that necessary to maintain the desired daytime temperature in order to bring the temperature of the building up from the temperature maintained during the night to the desired daytime temperature. The herein described arrangement provides apparatus commonly referred to as a morning pickup for supplying this additional heat, and a saving in fuel is accomplished by the indoor thermostat arrangement which terminates the supplying of additional heat as soon as the indoor temperature has reached the desired value. Personal attention to the furnace is avoided as the system automatically operates to maintain a fire at times when no heating is needed and will automatically discontinue the fuel supply in the event of the fire accidentally going out or unduly high boiler temperatures.

The structural arrangement, novel features and utility of my invention have been pointed out in connection with two embodiments thereof. However, it is to be understood that there are many other modifications and forms which my invention may take and it is to be understood that the present embodiments are to be interpreted as illustrative only. The invention is to be limited only by the scope of the appended claims.

I claim as my invention:

1. In a heating system employing a fluid heating medium and having a stoker for feeding fuel, in combination, means for intermittently operating said stoker comprising a control apparatus constructed and arranged for periodically operating said stoker for intervals of predetermined duration, said control apparatus including devices responsive to outdoor and heating medium temperatures for varying the duration of operating periods of said stoker, said devices cooperatively controlling the stoker to maintain the heating medium at predetermined temperatures corresponding to the heating load requirements as determined by outdoor temperatures, said control apparatus including means automatically operable to operate said stoker at reduced capacity at night, irrespective of outdoor temperature.

2. In a heating system employing a fluid heating medium and having a stoker for feeding fuel, in combination, means for intermittently operating said stoker comprising a control apparatus constructed and arranged for periodically operating said stoker for intervals of predetermined duration, said control apparatus including devices responsive to outdoor and heating medium temperatures for varying the duration of operating periods of said stoker, said devices cooperatively controlling the stoker to maintain the heating medium at predetermined temperatures corresponding to the heating load requirements as determined by outdoor temperatures, said control apparatus including means automatically operable to operate said stoker at night to produce a relatively low rate of heat generation and to operate said stoker for a period of time in the morning to produce a rate of heat generation above that necessary to maintain the desired daytime temperature.

3. In a heating system employing a fluid heating medium and having a stoker for feeding fuel, in combination, means for intermittently operating said stoker for periods of predetermined duration, said means including control apparatus for varying the duration of operating periods, said control apparatus being responsive to outdoor and heating medium temperatures for controlling said stoker to maintain the heating medium at predetermined temperatures corresponding to the heating load as determined by outdoor temperatures, said control apparatus including automatic timed mechanism operative to cause said stoker to maintain the heating medium temperature at night at a predetermined number of degrees below the aforesaid predetermined temperatures, and automatic timed mechanism operative to cause said stoker to maintain the heating medium temperature for a period of time in the morning at a predetermined number of degrees above the aforesaid predetermined temperatures, whereby the heating system supplies extra heat in the morning to compensate for the low temperatures maintained during the night.

4. In a heating system having a boiler, in combination, an automatic stoker, means for intermittently operating said stoker for periods of predetermined duration, said means including control apparatus for varying the duration of operating periods, said control apparatus being responsive to outdoor and boiler water temperatures for controlling said stoker to maintain the boiler water at predetermined temperatures corresponding to the heating load as determined by outdoor temperatures, said control apparatus also including means operative to cause said stoker to maintain the boiler water temperature at night at a predetermined number of degrees below the aforesaid predetermined temperatures and to maintain the boiler water temperature for a period of time in the morning at a predetermined number of degrees above the aforesaid predetermined temperatures, said last means including an indoor thermostat for terminating said period of time when the indoor temperature reaches a predetermined desired value.

5. In a heating system having a boiler in combination, a stoker, means for intermittently operating said stoker comprising a control apparatus constructed and arranged for normally periodically operating said stoker for intervals of predetermined duration, said control apparatus including devices responsive to outdoor and boiler water temperatures for varying the duration of normal operating periods of said stoker, said devices cooperatively controlling the stoker to maintain the boiler water at predetermined temperatures corresponding to the heating load requirements as determined by outdoor temperatures, means for reducing the length of said normal periods during predetermined times, means for increasing the length of said normal periods during predetermined times, and means comprising an indoor thermostat for causing the lengths of said periods to be returned to normal during said last mentioned predetermined times if the indoor temperature rises to a predetermined value.

6. In a heating system having a boiler in combination, a stoker, control apparatus for intermittently operating said stoker constructed and arranged for periodically operating said stoker for intervals of predetermined duration, said control apparatus comprising cam means, means including heaters for adjusting said cam means, a potentiometer circuit arrangement controlling the energization of said heaters, said arrangement including a device responsive to outdoor temperature and a device responsive to boiler water temperature, said devices cooperatively controlling said stoker for varying the duration of operating periods thereof to maintain the boiler water at predetermined temperatures corresponding to the heating load requirements as determined by outdoor temperatures, 7. In a heating system having a boiler in combination, a stoker, control apparatus for intermittently operating said stoker constructed and arranged for periodically operating said stoker for intervals of predetermined duration, said control apparatus comprising cam means, means including heaters for adjusting said cam means, a potentiometer circuit arrangement controlling the energization of said heaters, said arrangement including a device responsive to outdoor temperature and a device responsive to boiler water temperature, said devices cooperatively controlling said stoker for varying the duration of operating periods thereof to maintain the boiler water at predetermined temperatures corresponding to the heating load requirements as determined by outdoor temperatures, and timing means for varying the characteristics of the potentiometer circuit arrangement during predetermined times whereby the effect of said heaters is varied accordingly in a manner to cause the boiler water temperature to assume values above or below normal as desired during said predetermined times.

8. In a heating system employing a fluid heating medium, in combination, a stoker means controlling said stoker comprising control apparatus including a potentiometer circuit having electrical resistance means associated therewith, control devices responsive to outdoor temperature and a condition of the heating medium and relay means responsive to said devices, said devices cooperatively controlling the operation of the stoker through the relay means to normally maintain the condition of the heating medium at predetermined normal values corresponding to the heating load requirements as determined by outdoor temperatures, timing means for adjusting said resistance means to vary the operation of said control apparatus for reducing the said values below normal during the night, and for raising the said values above normal for a period of time in the morning, and space temperature responsive means for terminating said last mentioned period of time.

CHARLES B. SPANGENBERG.